Nov. 21, 1933.  H. F. OBERGFELL ET AL  1,935,913
TELEPHONE SUBSTATION APPARATUS
Filed Dec. 14, 1931  2 Sheets-Sheet 1
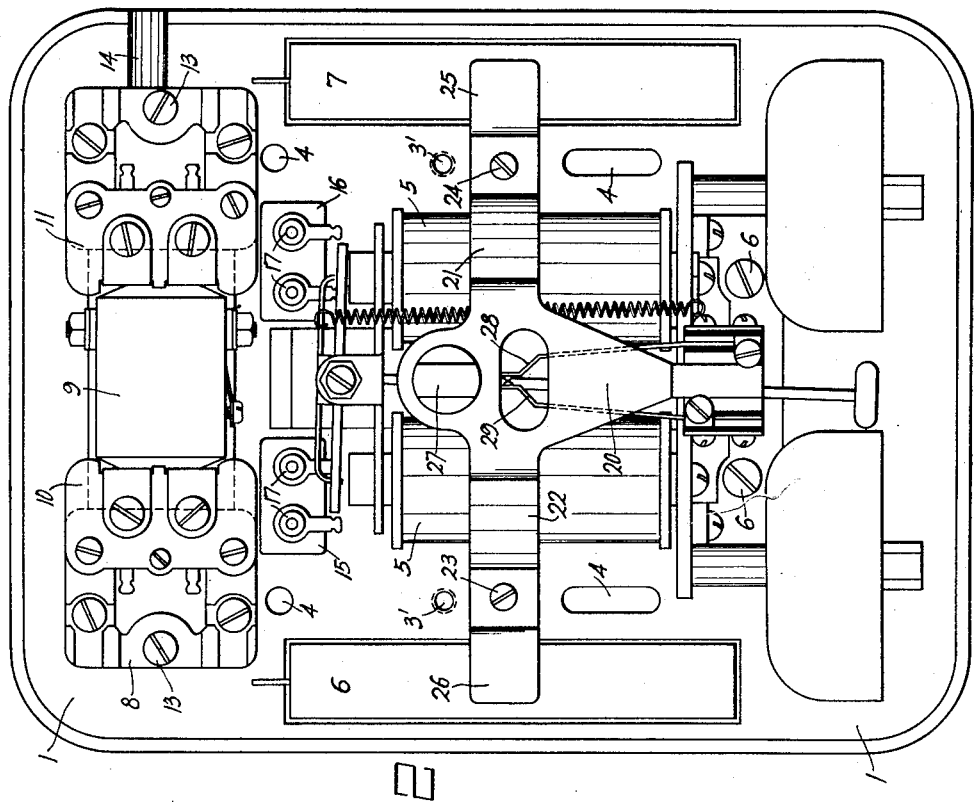
Inventors
Herbert F. Obergfell
George W. Eickenberg
Clinton R. Sipe
Atty.

Nov. 21, 1933. H. F. OBERGFELL ET AL 1,935,913
TELEPHONE SUBSTATION APPARATUS
Filed Dec. 14, 1931 2 Sheets-Sheet 2
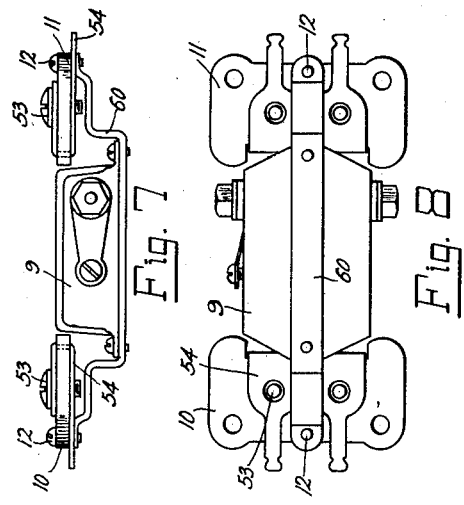
Inventors
Herbert F. Obergfell
George W. Eickenberg
Clinton R. Sipe
Atty.

Patented Nov. 21, 1933

1,935,913

UNITED STATES PATENT OFFICE 1,935,913

TELEPHONE SUBSTATION APPARATUS

Herbert F. Obergfell, River Forest, and George W. Eickenberg, Chicago, Ill., assignors, by mesne assignments, to Associated Electric Laboratories, Inc., Chicago, Ill., a corporation of Delaware Application December 14, 1931
Serial No. 580,896

5 Claims. (Cl. 179—100)

This invention relates in general to telephone substation apparatus, and more particularly to improvements in ringer boxes and other signalling equipment for such apparatus.

The principal object of the invention resides in a design of an improved ringer or signalling box having a pleasing appearance, which is efficient in operation and in which all of the pieces of telephonic apparatus comprising the box are mounted in a compact arrangement so that all the telephonic and signalling equipment may be combined in a single unit, thereby avoiding the use of unsightly external equipment and wiring.

A further object of the invention is to design a ringer box so that a switching key may be mounted in the cover thereof for controlling additional signalling means.

A further object resides in the design of a combination terminal strip and induction coil spool head for extending all of the internal connections of the ringer box thereto.

A further object of the invention resides in the design of a compact extension box for use at extension telephones where no ringer is provided.

In accordance with the above and additional objects, the invention comprises a number of novel features which will be hereinafter specifically pointed out in connection with the two sheets of drawings which show a preferred embodiment of the invention.

Referring more specifically to the drawings, Fig. 1 discloses the general exterior appearance of the complete ringer box on a reduced scale. Fig. 2 discloses a top view of the ringer box showing all of the apparatus in its normal position and in full size. Fig. 3 is a perspective view of the supporting bracket arrangement for the switching key and condensers.

Fig. 4 discloses the general external appearance of an improved extension box on a reduced scale. Fig. 5 is a top view of the extension box showing the general arrangement of the apparatus in full size. Fig. 6 is a perspective view of a supporting bracket in the extension box, while Figs. 7 and 8 are side and top views, respectively, of a combination buzzer, supporting means, and terminal blocks which are mounted on top of the apparatus shown in Fig. 5 and also in Fig. 2.

Referring now more specifically to the complete ringer box and apparatus shown in Figs. 1, 2, and 3 the base 1 of the ringer box which supports all of the apparatus mounted in the box, and the cover 2 which fits snugly around it, are constructed of synthetic resin or "bakelite", so as to present a pleasing appearance as this material retains its finish indefinitely. It is furthermore immune to corrosion and may be moulded to any desired shape or form. The cover 2 is held in position on the base 1 by means of a pair of screws 3 which are threaded into the holes 3' Fig. 2 provided in the base. The base plate 1 itself may be mounted on a wall or other suitable support by means of screws in the holes 4. A conventional type of ringer and gong 5 is supported on the base of the box by the screws 6 which support the gongs, coil, and other parts of the ringer as a complete unit. A pair of condensers 6 and 7 are arranged on either side of the ringer 5 and are set in a shallow cut-out portion of the base 1 which is of the general contour of the condensers so as to prevent relative shifting movement of the condensers. An induction coil indicated generally at 8, the spool heads of which likewise serve as terminal blocks, is supported on the top side of the base 1 by means of screws 13 on either end. A standard type of buzzer 9 together with the additional terminal plates 10 and 11 are supported on top of the induction coil 8. The induction coil, terminal plates, and buzzer arrangement are identical with that disclosed in the modification of Fig. 5 and will be described in more detail in connection with the description of Fig. 5. A groove or slot 14 in the base 1 and likewise in the cover 2 permits entrance of the connecting leads extending from the desk set or telephone to the terminal posts on the induction coil 8. A pair of terminal blocks 15 and 16 moulded out of the base 1 support soldering tags 17 to which line wires and other conductors extending to the various pieces of the apparatus inside the box are connected. These tags 17 are riveted to studs extending through the base and have screws on the rear side of the base (not shown) to which the permanent line conductors and other wires are connected, thereby avoiding the necessity of providing additional openings in the base. The bottom side of the cover 2 has a series of slots 31 cut in it to permit the sound waves of the gongs from the ringer 5 to escape. These slots are covered inside with suitable screening. By providing the least number of possible openings to the ringer box a structure is designed which prevents the possibility of insects, bugs and dust from entering the box and affecting the operation of the apparatus.

A supporting bracket 20 having a pair of outwardly and downwardly projecting legs 21 and 22 is arranged to straddle the ringer coils 5. Screws 24 in the leg 21 and 23 in the leg 22 serve to hold the bracket 20 onto the base 1. Z-shaped brackets 25 and 26 are also supported on the base 1 by screws 23 and 24 and serve to rigidly clamp the condensers 6 and 7 to the base 1 on each side of the ringer 5. A pair of circuit control springs 28 and 29 are supported and suitably insulated from a downwardly projecting portion of the bracket 20. A switch 27 of the turn key type is mounted in another projection formed in the supporting bracket 20. The opposite end of this turn key is arranged to control the sets of springs 28 and 29 and the turning movement of the key is limited by the stop pin 30. Suitable screw terminals are arranged on the ends of the contact springs 28 and 29 for the connection thereto of connecting leads.

If the use of turn key 27 is not required in an installation the bracket 20 may be removed by merely loosening the screws 23 and 24 and using them to simply hold the Z-shaped brackets 25 and 26 supporting condensers 6 and 7. When it is required to provide a switching key 27 it is merely necessary to drill a hole into the cover 2 and mount the brackets as described. The key 27 and the contact springs 28 and 29 which it controls may be connected in circuit with the windings of the ringer 5, so that by the operation of the turn key 27 the ringer 5 may be disconnected from the circuit. By providing this arrangement an executive and his secretary may each be provided with a ringer box, as shown, and the executive may, by operating the key 27, disconnect his ringer so that only the ringer of the secretary will be operated on an incoming call. If the call is for the executive and the secretary answered it she may operate an extension switch button to control the buzzer 9 and signal the executive.

It will be seen that with the general appearance of the apparatus supported in the base 1 of the ringer box that the whole presents a pleasing appearance to the eye; each separate piece of apparatus is readily accessible for replacement, repair, or the changing of wires and connecting leads, and a compact structure results in which each individual piece of apparatus does not necessarily require separate insulating means to insulate it electrically from the base 1, because this base is constructed of inherently insulated material. No separate terminal blocks as is usually necessary are required with this arrangement because the spool heads of the induction coil 8 serve this purpose. The particular arrangement of the pieces of apparatus therefore presents numerous advantages over the previous type of ringer boxes containing similar pieces of apparatus.

The structure shown in the modification in Figs. 4 and 5 comprises an extension telephone box which is similar to that disclosed in Fig. 1, except that it is considerable smaller in that no ringer is provided. This extension box serves a telephone such as may be used by an executive which may be an extension of another line in which all calls are answered by the executive's secretary, the secretary having a ringer and box such as shown in Fig. 1. The extension box comprises a base 40 having a cover 41 which fits snugly to the base, both base and cover being constructed of some phenolic condensation product, such as "bakelite", which may be easily moulded to the required shape. A screw 42 threaded into a hole 42' serves to secure the cover to the base as will be pointed out in more detail. The base 40 may be attached to any suitable support as by screws in the holes 43. A pair of grooves 44 in the base and contemporary ones in the cover 41 permits entrance of associating connecting wires to the apparatus within the box. A condenser unit 45 standing on end rests in a recess in the base 40 which prevents lateral movement thereof, and a strap 46 having bolts 47 on each end thereof engage the ears 49 and 49' of the supporting bracket 48, to clamp the condenser 45 in position on the base 40. The bracket 48 is fastened to the base 40 by means of screws in its extension piece 50. The hole 42' is provided for securing cover 41 by means of the screw 42 and the notched end of the extension arm of the bracket provides a means for attaching the cord of the connecting wires so that the wires will not be subjected to undue strains at their ends. From this it is seen that the bracket 48 provides a means for securing the condenser 45 to the base, attaching the connecting cord to, and also for securing the cover, all in a single unitary structure.

The induction coil indicated generally at 8 in Figs. 2 and 5 is supported in the base 40 by means of the screws 13 extending through each spool head of the coil. The specific structure of the combination spool heads and terminal block for the induction coil is disclosed in a copending application of Herbert F. Obergfell, Serial No. 580,-395, filed Dec. 14, 1931, and forms no part of the present application except as will be pointed out in more detail. A number of terminal screws and associated soldering tags are moulded into each of the insulated spool heads as shown at 51 for the connection of the windings of the induction coil which extend between the ends of the two spool heads, as pointed out more specifically in the above-mentioned co-pending application and for the other apparatus in the box. Insulating plates 10 and 11, each containing a pair of screw terminals 53 and associated soldering tags 54, are supported on top of the spool heads 8 of the induction coil by means of a pair of screws 52. The screws 52 may be threaded into one of the terminal posts, such as 51, and in addition to serving as a supporting means for the insulating plates 10 and 11, may also provide an additional terminal post. The terminal screws 53 and their soldering tags 54 provide additional terminals for the connection of various conductors extending from the different pieces of apparatus, such as the windings of the induction coil, the condenser 45, etc.

Referring more particularly to Figs. 7 and 8 the buzzer 9 which may be of any conventional type having a cover thereon and a terminal post on each side of it, is screwed onto and supported by the bracket 60 which in turn is fastened by means of the screws 12 on either end to the insulated plates 10 and 11. The shape of the bracket 60 is such that it permits the buzzer 9 to fit closely between the insulated terminal plates 10 and 11 and at a slightly lower level than these plates and directly above the windings of the induction coil. This arrangement permits a compact, easily accessible and removable arrangement, of the various parts and pieces of the apparatus without undue crowding of the parts and at the same time perfectly insulating all of the terminal posts so that the wiring connections may be conveniently made. Since the cover 41 and base 40 are constructed of insulating material no special means for insulating the pieces of apparatus from these parts need be provided. The buzzer 9 is provided as a means whereby a secretary at a main telephone substation provided with a regular ringer as in Fig. 1 may signal the executive by means of a push button and operate the buzzer 9, and by combining this buzzer with the regular extension box a single unitary arrangement is provided. In case the buzzer is not required it is merely necessary to loosen the screws 12 to remove it from the bracket 60. By providing the insulating plates 10 and 11, separate fixing means for the bracket 60 are not necessary, and at the same time, by providing these insulating plates and the terminal posts 51 on top of the spool head, the necessity of providing additional terminal plates for the apparatus, such as is usually provided in extension boxes of this type is obviated. This extension box as well as the ringer box, being of a compact unitary structure in which all the apparatus is supported, may be mounted in close proximity to the telephone substation without detracting from the general pleasing appearance of the whole device. The openings 44 in the side of the extension are small enough so that the wires extending to the interior apparatus of the box will fill them completely, thereby preventing the entrance of insects, particles of dirt and dust which may interfere with the proper operation of the apparatus. One of these openings is provided for the connecting leads to the telephone substation, while the other one is provided for the line wires.

What is claimed is:

1. In a compact arrangement of telephone substation apparatus, a base plate, an induction coil having a combination spool head and terminal block on each end of the coil secured to the base plate, and an assembly comprising a terminal plate and buzzer mounted on top of said spool heads, said buzzer assembly bridged across the spool heads and secured to the terminals of the spool heads.

2. In a telephone substation apparatus, a base plate and a cover, a condenser on said base plate, a bracket on said base plate rigidly securing the condenser to the plate, and means on the bracket for securing the cover to the base.

3. In a substation telephone apparatus, the combination of a base plate and a cover, together with an induction coil having combination spool heads and terminal blocks secured to the base, a combination buzzer and terminal plate secured between the ends of the spool heads, a condenser on the base plate alongside the induction coil, and a bracket secured to the base plate between the condenser and induction coil for clamping the condenser in position in the base and for securing the cover to the base.

4. In a telephone substation apparatus, a base plate, a cover for the base plate, a condenser and induction coil mounted side by side on said base plate, said induction coil having insulated spool heads combined with terminal blocks, a buzzer and terminal strip arranged between the spool heads on top of the induction coil, a bracket member secured to the base plate and having a pair of projections for supporting the condenser on the base plate, and another projection on said bracket member for securing the cover tightly against the base plate.

5. In a substation telephone apparatus, a base plate; an induction coil, having spool heads equipped as terminal assemblies, secured to said base plate; and a signalling device, also equipped with terminal assemblies, bridging said spool heads.

HERBERT F. OBERGFELL.
GEORGE W. EICKENBERG.